United States Patent
Chen et al.

(10) Patent No.: US 8,704,978 B2
(45) Date of Patent: Apr. 22, 2014

(54) LCD PANEL AND FABRICATING METHOD THEREOF

(75) Inventors: Jing-Ru Chen, Hsin-Chu (TW);
Wei-Hsien Wu, Hsin-Chu (TW);
Cheng-Hung Chen, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 210 days.

(21) Appl. No.: 13/218,564

(22) Filed: Aug. 26, 2011

(65) Prior Publication Data

US 2012/0050633 A1    Mar. 1, 2012

(30) Foreign Application Priority Data

Aug. 27, 2010    (TW) ............................... 99128920 A (51) Int. Cl.
*G02F 1/1333*    (2006.01)
*G02F 1/1345*    (2006.01)

(52) U.S. Cl.
USPC ............... 349/92; 349/94; 349/149; 349/151; 349/191; 345/100

(58) Field of Classification Search
USPC ............. 349/92–94, 149, 151, 187, 191, 192; 345/100
See application file for complete search history.

(56) References Cited

U.S. PATENT DOCUMENTS

| | | | |
|---|---|---|---|
| 6,778,229 B2 | 8/2004 | Inoue et al. | |
| 2003/0090614 A1* | 5/2003 | Kim et al. | 349/149 |
| 2003/0112384 A1* | 6/2003 | Tanaka et al. | 349/43 |
| 2007/0001962 A1* | 1/2007 | Hasegawa et al. | 345/95 |

* cited by examiner

*Primary Examiner* — Michael Caley (74) *Attorney, Agent, or Firm* — WPAT, PC; Justin King (57) ABSTRACT

A LCD panel includes a gate driver, an active-matrix array and a switching circuit. The gate driver is disposed on a thin film transistor substrate, and includes a shift register, wherein the shift register has plural output terminals for successively outputting plural gate driving signals. The active-matrix array is disposed on the thin film transistor substrate, and includes plural gate lines, wherein the gate lines are connected with the output terminals of the shift register. The switching circuit is disposed on the thin film transistor substrate, and includes plural switching units, wherein each of the switching units has a first terminal electrically connected with one of the output terminals of the shift register, a control terminal electrically connected with a first input pad, and a second terminal electrically connected with a second input pad.

16 Claims, 7 Drawing Sheets

LCD PANEL AND FABRICATING METHOD THEREOF

FIELD OF THE INVENTION

The present invention relates to a LCD panel and a fabricating method thereof, and more particularly to a LCD panel and a fabricating method thereof to be applied to a polymer stabilized alignment process.

BACKGROUND OF THE INVENTION

As known, a LCD panel comprises a color-filtering substrate, a liquid crystal layer and a thin film transistor (TFT) substrate. The liquid crystal layer is arranged between the color-filtering substrate and the TFT substrate.

Figure 1:
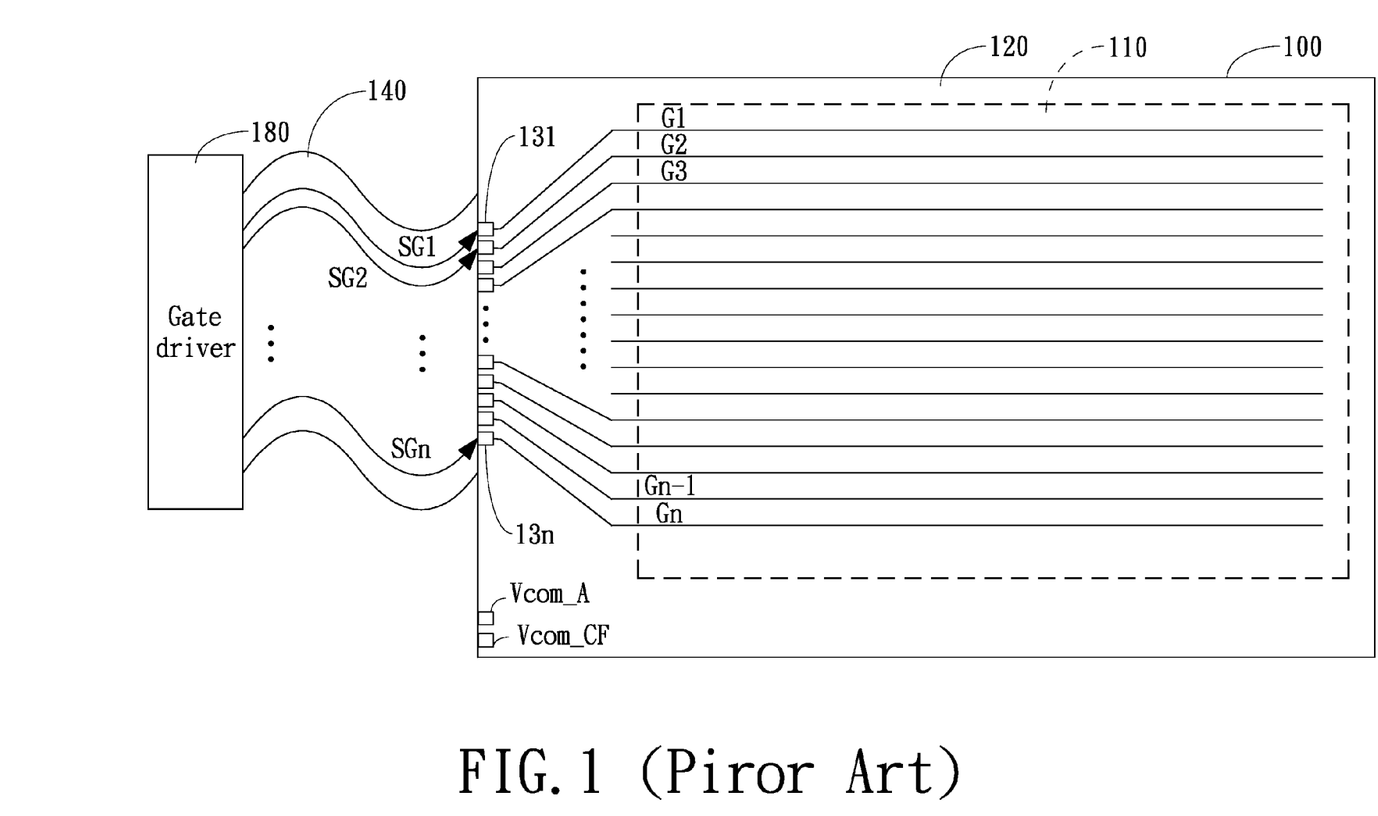
FIG. 1 is a schematic diagram illustrating a TFT substrate of a LCD panel according to the prior art.

FIG. 1 is a schematic diagram illustrating a TFT substrate of a LCD panel according to the prior art. As shown in FIG. 1, the TFT substrate 100 of a LCD panel comprises a visible zone 110 and an invisible zone 120. The visible zone 110 includes the region circumscribed by a dashed line, and the invisible zone 120 includes the region that is not circumscribed by the dashed line. The visible zone 110 includes an active-matrix array. The active-matrix array comprises plural gate lines G1~Gn. In addition, plural gate input pads 131~13n are formed on an edge of the TFT substrate 100. Through the layout trace of the invisible zone 120, the gate lines G1~Gn are connected with corresponding gate input pads 131~13n, respectively. Moreover, the gate input pads 131~13n are connected with a gate driver 180 through a flexible cable 140. Consequently, the gate driving signals outputted from the gate driver 180 can be transmitted to all of the gate lines G1~Gn of the visible zone 110 for turning on pixels (not shown) of the active-matrix array. The TFT substrate 100 further includes other kinds of input pads such as a TFT substrate common voltage input pad Vcom_A and a color-filtering substrate common voltage input pad Vcom_CF for providing common voltages to the TFT substrate and the color-filtering substrate, respectively.

As known, the active-matrix array further comprises plural source lines, which are connected with an external source driver for receiving data signals. For clarification and brevity, the source lines are not shown in FIG. 1.

For fabricating the conventional LCD panel, it is necessary to perform a polymer stabilized alignment (PSA) process. After the PSA process is done, the liquid crystal molecules within the liquid crystal layer of the LCD panel are aligned in a specified direction. Consequently, the LCD panel has many advantages such as high brightness, high contrast ratio and fast response time.

Moreover, during the PSA process is performed, a specified voltage is simultaneously provided to all of the gate lines G1~Gn, and heat energy or a UV ray is provided to the liquid crystal layer. In such way, the liquid crystal molecules are aligned in the specified direction. Of course, the specified voltage may be simultaneously provided to the TFT substrate common voltage input pad Vcom_A and the color-filtering substrate common voltage input pad Vcom_CF.

Figure 2:
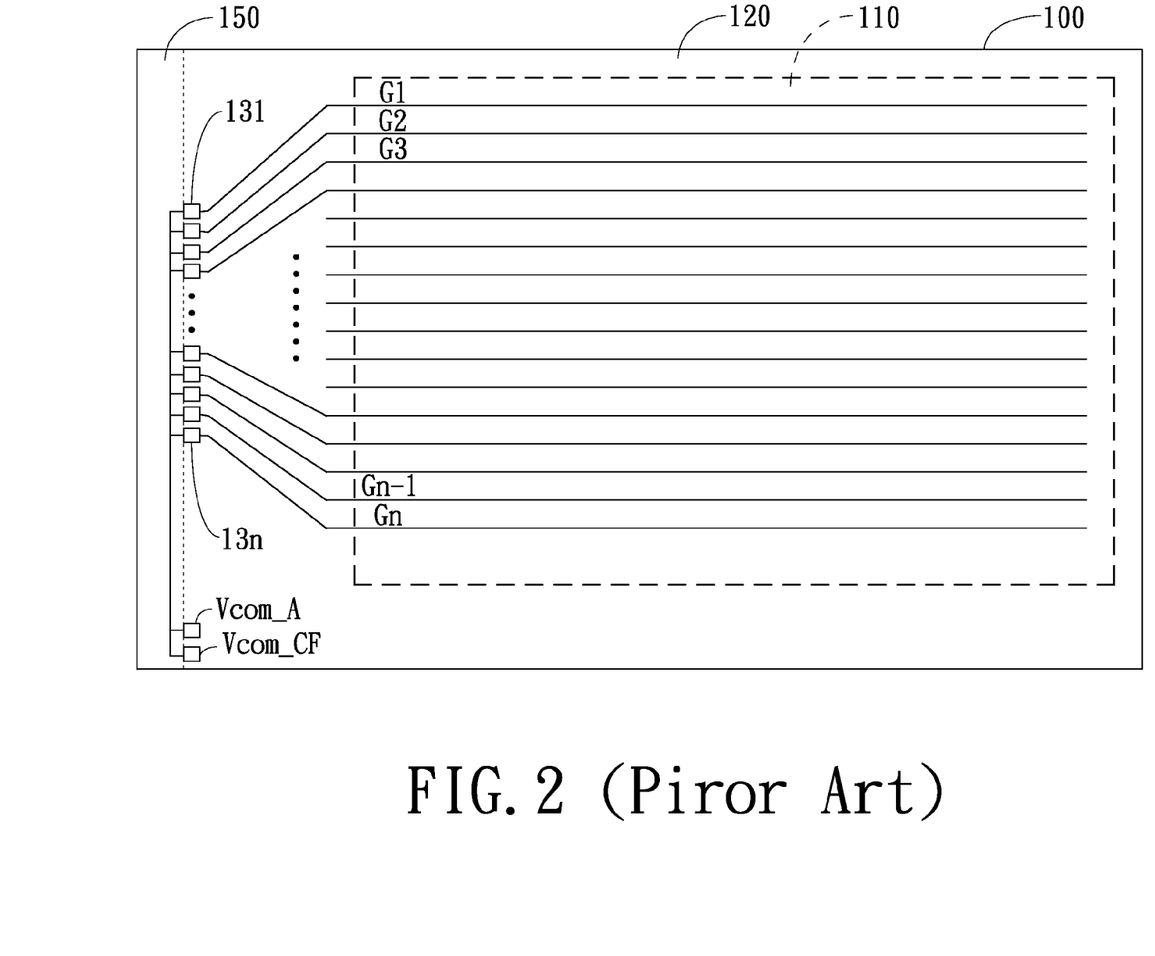
FIG. 2 is a schematic diagram illustrating the LCD panel produced after the conventional PSA process is done.

FIG. 2 is a schematic diagram illustrating the LCD panel produced after the conventional PSA process is done. Like FIG. 1, the TFT substrate 100 of FIG. 2 also comprises a visible zone 110 and an invisible zone 120, wherein the visible zone 110 includes the region circumscribed by a dashed line, and the invisible zone 120 includes the region that is not circumscribed by the dashed line. For providing a constant voltage to all of the gate lines G1~Gn, the TFT substrate common voltage input pad Vcom_A and the color-filtering substrate common voltage input pad Vcom_CF during the PSA process is performed, TFT substrate 100 of FIG. 2 further comprises a slicing zone 150. The gate input pads 131~13n are partially or completely connected with each other through the layout trace of the slicing zone 150. In addition, the TFT substrate common voltage input pad Vcom_A and the color-filtering substrate common voltage input pad Vcom_CF are also connected with the gate input pads 131~13n through the layout trace of the slicing zone 150.

In other words, during the PSA process is performed, if the specified voltage is provided to any input pad, the specified voltage may be provided to all of the gate lines G1~Gn, the TFT substrate common voltage input pad Vcom_A and the color-filtering substrate common voltage input pad Vcom_CF. In addition, after the heat energy or UV ray is provided to the liquid crystal layer, the liquid crystal molecules are aligned in the specified direction.

After the PSA process is completed, the slicing zone 150 is cut off by a laser cutting technology. Meanwhile, the gate lines G1~Gn, the TFT substrate common voltage input pad Vcom_A and the color-filtering substrate common voltage input pad Vcom_CF are no longer connected with each other. Afterwards, the gate input pads 131~13n will be connected with the gate driver through the flexible cable.

Recently, for reducing the fabricating cost of the LCD panel, the gate driver may be directly formed on the TFT substrate to define a gate driver on array substrate (GOA substrate). Since the gate driver is directly formed on the TFT substrate, it is not necessary for the manufacturer to additional purchase the gate driver and the flexible cable.

Figure 3:
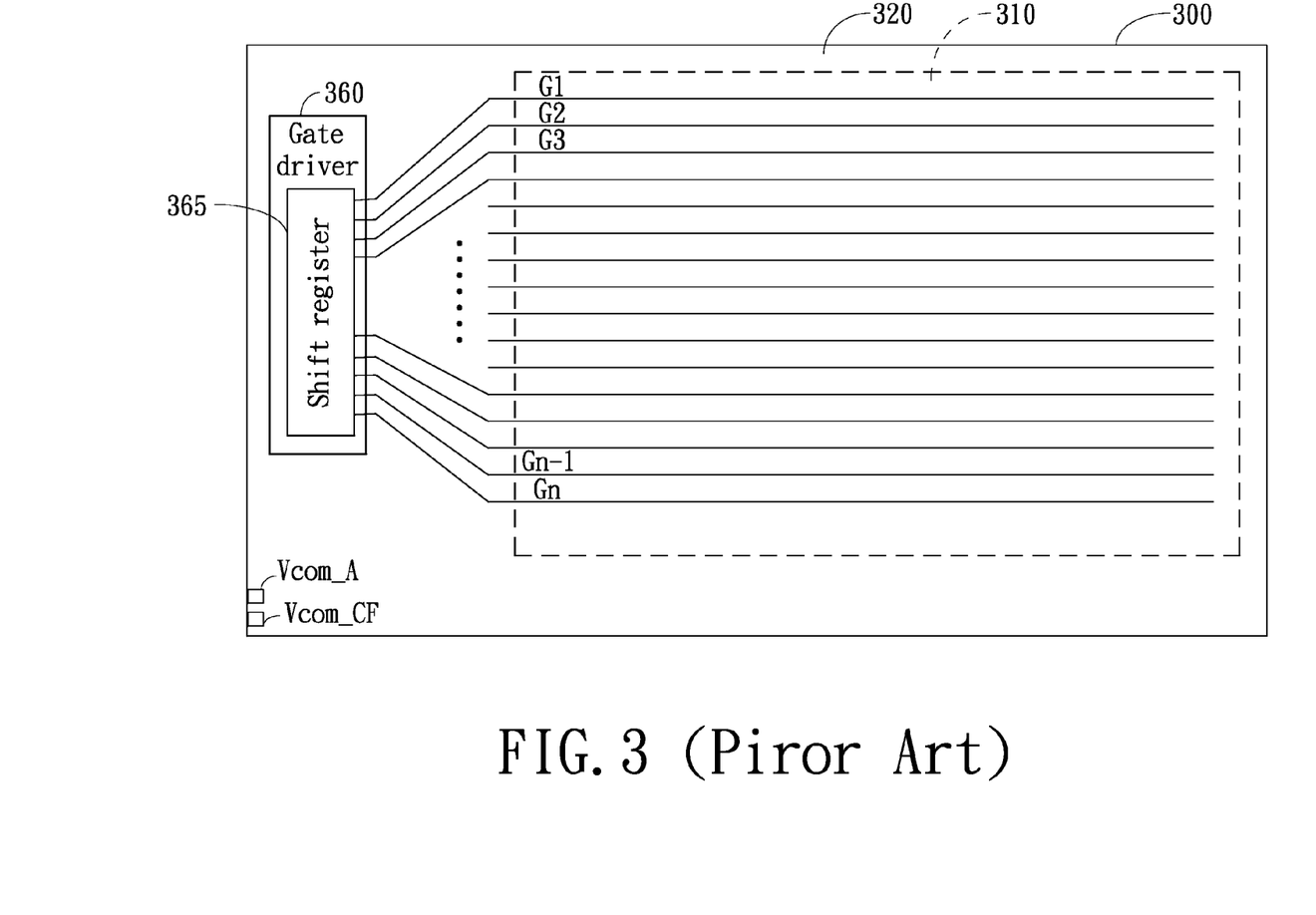
FIG. 3 is a schematic diagram illustrating a GOA substrate of a conventional LCD panel.

FIG. 3 is a schematic diagram illustrating a GOA substrate of a conventional LCD panel. The GOA substrate 300 of the conventional LCD panel comprises a visible zone 310 and an invisible zone 320, wherein the visible zone 310 includes the region circumscribed by a dashed line, and the invisible zone 320 includes the region that is not circumscribed by the dashed line. The visible zone 310 includes an active-matrix array. The active-matrix array comprises plural gate lines G1~Gn. The invisible zone 320 of the GOA substrate 300 further comprises a gate driver 360. The gate driver 360 comprises a shift register 365. The output terminals of the shift register 365 are successively connected with corresponding gate lines G1~Gn through the layout trace. Consequently, the gate driving signals outputted from the shift register 365 can be transmitted to all of the gate lines G1~Gn of the visible zone 310 for turning on pixels (not shown) of the active-matrix array. The GOA substrate 300 further includes other kinds of input pads such as a TFT substrate common voltage input pad Vcom_A and a color-filtering substrate common voltage input pad Vcom_CF for providing common voltages to the TFT substrate and the color-filtering substrate, respectively. The active-matrix array further comprises plural source lines, which are connected with an external source driver (not shown) for receiving data signals.

However, the polymer stabilized alignment (PSA) process of the GOA substrate 300 incurs some difficulties. For example, since the gate lines G1~Gn are directly connected with the shift register 365 of the gate driver 360, the conventional GOA substrate 300 fails to be implemented by the method of FIG. 2, which includes the steps of connecting the gate lines G1~Gn to any input pad, providing the specified voltage to the input pad, and disconnecting the gate lines G1~Gn from each other after the PSA process is done.

In a case that the specified voltage fails to be simultaneously received by the gate lines G1~Gn, the active-matrix array of the visible zone may be suffered from so-called Mura defects. Due to the Mura defects, the product yield of the LCD panel is largely reduced.

SUMMARY OF THE INVENTION

Therefore, the present invention provides a LCD panel and a fabricating method thereof. The GOA substrate of the LCD panel further includes a switching circuit. During the PSA process of the LCD panel is performed, a specified voltage is transmitted to all gate lines of the GOA substrate through the switching circuit. Consequently, after the PSA process is completed, the Mura defects that are usually generated in the active-matrix array of the visible zone of the conventional GOA substrate will be eliminated.

In accordance with a first aspect, the present invention provides a LCD panel. The LCD panel includes a gate driver, an active-matrix array and a switching circuit. The gate driver is disposed on a thin film transistor substrate, and includes a shift register, wherein the shift register has plural output terminals for successively outputting plural gate driving signals. The active-matrix array is disposed on the thin film transistor substrate, and includes plural gate lines, wherein the gate lines are connected with the output terminals of the shift register. The switching circuit is disposed on the thin film transistor substrate, and includes plural switching units, wherein each of the switching units has a first terminal electrically connected with one of the output terminals of the shift register, a control terminal electrically connected with a first input pad, and a second terminal electrically connected with a second input pad.

In accordance with a second aspect, the present invention provides a LCD panel. The LCD panel includes a gate driver, an active-matrix array and a switching circuit. The gate driver is disposed on a thin film transistor substrate, and includes a shift register, wherein the shift register has plural output terminals for successively outputting plural gate driving signals. The active-matrix array is disposed on the thin film transistor substrate, and includes plural gate lines, wherein the gate lines are connected with the output terminals of the shift register. The switching circuit is disposed on the thin film transistor substrate, and includes plural switching units, wherein each of the switching units has a first terminal electrically connected with one of the output terminals of the shift register, and a second terminal and a control terminal electrically connected with a first input pad.

In accordance with a third aspect, the present invention provides a fabricating method of a LCD panel. The LCD panel includes a thin film transistor substrate, a gate driver and an active-matrix array. The gate driver and the active-matrix array are disposed on the thin film transistor substrate. The gate driver includes a shift register having plural output terminals successively connected with plural gate lines of the active-matrix array. The fabricating method includes the following steps. Firstly, a switching circuit is formed on the thin film transistor substrate, wherein the switching circuit includes plural switching units, wherein each of the switching units has a first terminal electrically connected with one of the output terminals of the shift register, a control terminal electrically connected with a first input pad, and a second terminal electrically connected with a second input pad. Then, a first input pad is formed on the thin film transistor substrate, wherein the first input pad is electrically connected with the control terminal of the switching unit. Then, a second input pad is formed on the thin film transistor substrate, wherein the second input pad is electrically connected with a second terminal of the switching unit. Then, a color-filtering substrate is provided. Then, a polymer stabilized alignment process is performed. During the polymer stabilized alignment process is performed, a first voltage is provided to the first input pad, a second voltage is provided to the second input pad, and a liquid crystal layer is formed between the color-filtering substrate and the thin film transistor substrate. After the polymer stabilized alignment process is completely, the first input pad and the second input pad are respectively disconnected from the control terminal and the second terminal of the switching unit.

In accordance with a fourth aspect, the present invention provides a fabricating method of a LCD panel. The LCD panel includes a thin film transistor substrate, a gate driver and an active-matrix array. The gate driver and the active-matrix array are disposed on the thin film transistor substrate. The gate driver includes a shift register having plural output terminals successively connected with plural gate lines of the active-matrix array. The fabricating method includes the following steps. Firstly, a switching circuit is formed on the thin film transistor substrate, wherein the switching circuit includes plural switching units, wherein each of the switching units has a first terminal electrically connected with one of the output terminals of the shift register, and a second terminal and a control terminal electrically connected with each other. Then, a first input pad is formed on the thin film transistor substrate, wherein the first input pad is electrically connected with the control terminal of the switching unit. Then, a color-filtering substrate is provided. Then, a polymer stabilized alignment process is performed. During the polymer stabilized alignment process is performed, a first voltage is provided to the first input pad, and a liquid crystal layer is formed between the color-filtering substrate and the thin film transistor substrate. After the polymer stabilized alignment process is completely, the first input pad is disconnected from the control terminal of the switching unit.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 4:
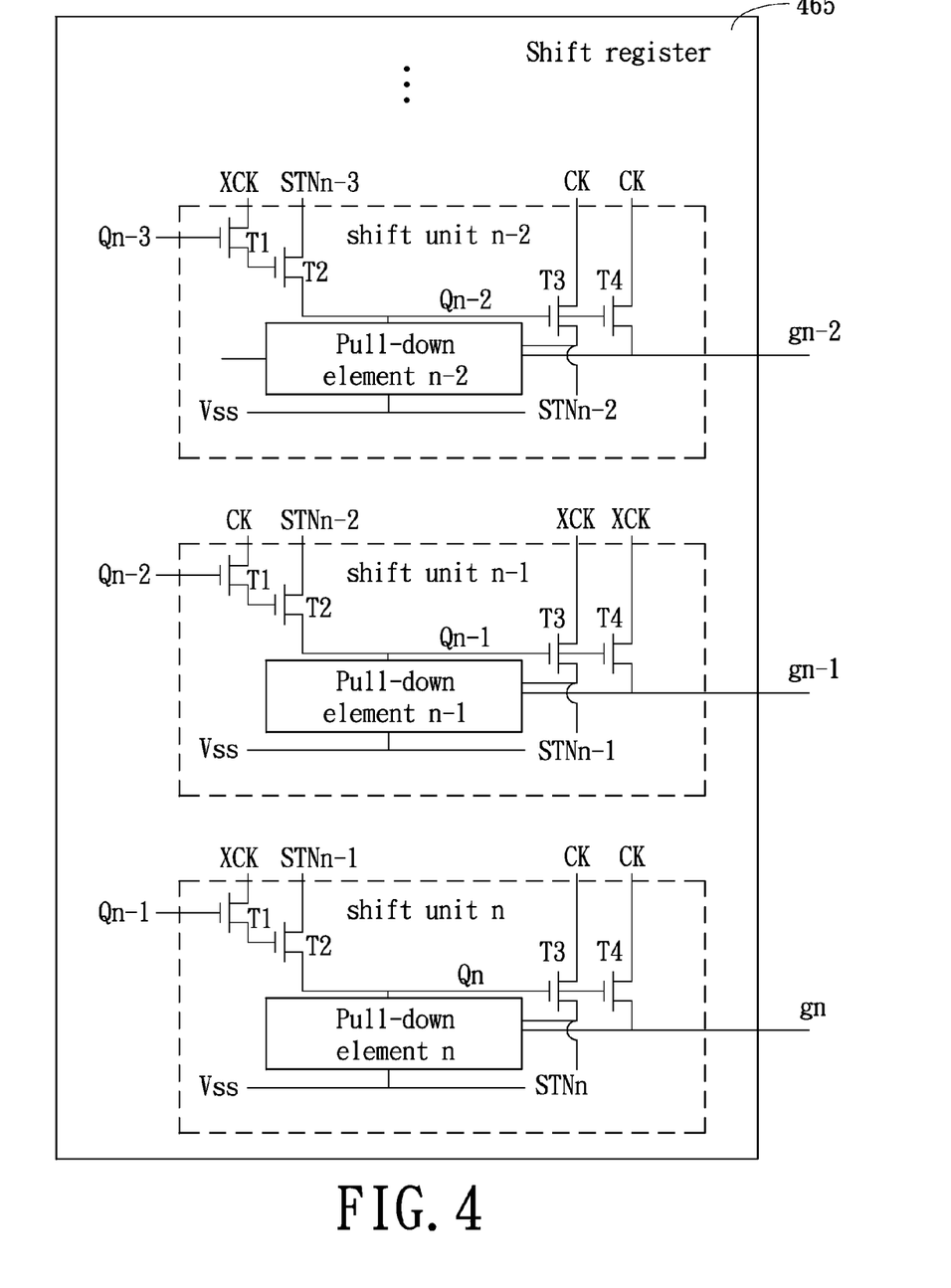
FIG. 4 is a schematic circuit diagram illustrating a shift register of a GOA substrate.

FIG. 4 is a schematic circuit diagram illustrating a shift register of a GOA substrate. The shift register 465 comprises a plurality of shift units. For clarification and brevity, only three shift units are shown in FIG. 4. Each of the shift units comprises a first transistor T1, a second transistor T2, a third transistor T3, a fourth transistor T4 and a pull-down element. Each of the shift unit is connected with a clock signal CK and an inverting clock signal XCK. Moreover, each shift unit is connected to a previous-stage shift unit.

Take the shift unit n-1 for example. The gate of the first transistor T1 of the shift unit n-1 receives a signal Qn-2 from the shift unit n-2. The drain of the transistor T1 of the shift unit n-1 receives the clock signal CK. The gate of the second transistor T2 of the shift unit n-1 is connected with the source of the first transistor T1. The drain of the second transistor T2 of the shift unit n-1 receives a signal STNn-2 from the shift unit n-2. The source of the second transistor T2 of the shift unit n-1 generates a signal Qn-1, and is connected with the pull-down element n-1. The gate of the third transistor T3 of the shift unit n-1 receives the signal Qn-1. The drain of the third transistor T3 of the shift unit n-1 receives the inverting clock signal XCK. The source of the third transistor T3 of the shift unit n-1 generates a signal STNn-1, and is connected with the pull-down element n-1. The gate of the fourth transistor T4 of the shift unit n-1 receives the signal Qn-1. The drain of the fourth transistor T4 of the shift unit n-1 receives the inverting clock signal XCK. The source of the fourth transistor T4 of the shift unit n-1 generates a gate driving signal gn-1, and is connected with the pull-down element n-1. In addition, the pull-down element n-1 is also connected with a lower voltage source Vss.

Generally, after the previous-stage shift unit (e.g. the shift unit n-2) generates the gate driving signal gn-2 and the signal STNn-2, the following actions are performed. That is, in response to the high-level state of the clock signal CK, the next-stage shift unit (e.g. the shift unit n-1) generates the signal Qn-1. In response to the high-level state of the inverting clock signal XCK, the shift unit n-1 outputs the gate driving signal gn-1 and the signal STNn-1. After the gate driving signal gn-1 is outputted, the gate driving signal gn-1 is maintained at the lower voltage source Vss by the shift unit n-1.

The operating principles of the other shift units are similar to those of the shift unit n-1, and are not redundantly described herein. As a consequence, the gate driving signals of all shift units are successively generated in a stage-by-stage manner.

Figure 5:
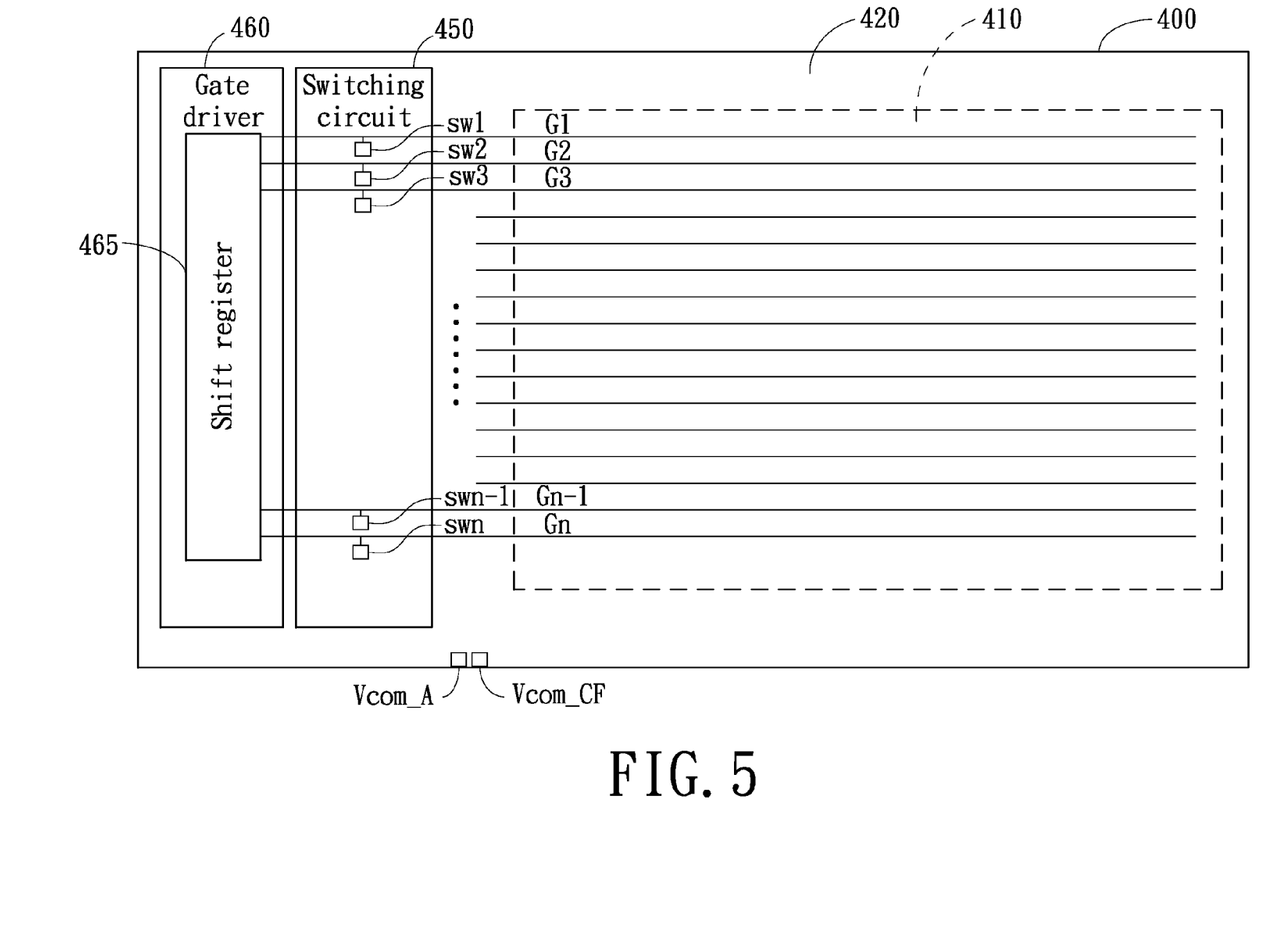
FIG. 5 is a schematic circuit diagram illustrating GOA substrate of a LCD panel according to an embodiment of the present invention.

FIG. 5 is a schematic circuit diagram illustrating GOA substrate of a LCD panel according to an embodiment of the present invention. The GOA substrate 400 of the LCD panel comprises a visible zone 410 and an invisible zone 420, wherein the visible zone 410 includes the region circumscribed by a dashed line, and the invisible zone 420 includes the region that is not circumscribed by the dashed line. The visible zone 410 includes an active-matrix array. The active-matrix array comprises plural gate lines G1~Gn. The invisible zone 420 of the GOA substrate 400 further comprises a gate driver 460. The gate driver 460 comprises a shift register 465. The output terminals of the shift register 465 are successively connected with corresponding gate lines G1~Gn through the layout trace for receiving the gate driving signals from corresponding shift units. Consequently, the gate driving signals outputted from the shift register 465 can be transmitted to all of the gate lines G1~Gn of the visible zone 410 for turning on pixels (not shown) of the active-matrix array. The GOA substrate 400 further includes other kinds of input pads such as a TFT substrate common voltage input pad Vcom_A and a color-filtering substrate common voltage input pad Vcom_CF for providing common voltages to the TFT substrate and the color-filtering substrate, respectively. The active-matrix array further comprises plural source lines, which are connected with an external source driver (not shown) for receiving data signals.

In accordance with a key feature of the present invention, the invisible zone 420 of the GOA substrate 400 further comprises a switching circuit 450. The switching circuit 450 is interconnected between the output terminals of the shift register 465 and all of the gate lines G1~Gn of the active-matrix array. The switching circuit 450 comprises plural switching units sw1~swn, which are connected to corresponding gate lines G1~Gn. According to a control signal, all of the switching units sw1~swn are controlled to be in either an open-circuit state or a short-circuit state. Moreover, during the PSA process is performed, all of the switching units sw1~swn are set to be in the short-circuit state according to the control signal. In the short-circuit state, a specified voltage may be transmitted to all of the gate lines G1~Gn. In such way, the Mura defects that are usually generated in the active-matrix array of the visible zone of the conventional GOA substrate will be eliminated.

Hereinafter, some embodiments of the switching circuit 450 and the relations between the switching units sw1~swn of the switching circuit 450 will be illustrated with reference to FIGS. 6 and 7. For clarification, only some of the switching units are shown to explain the operating principles of the switching units sw1~swn.

Figure 6:
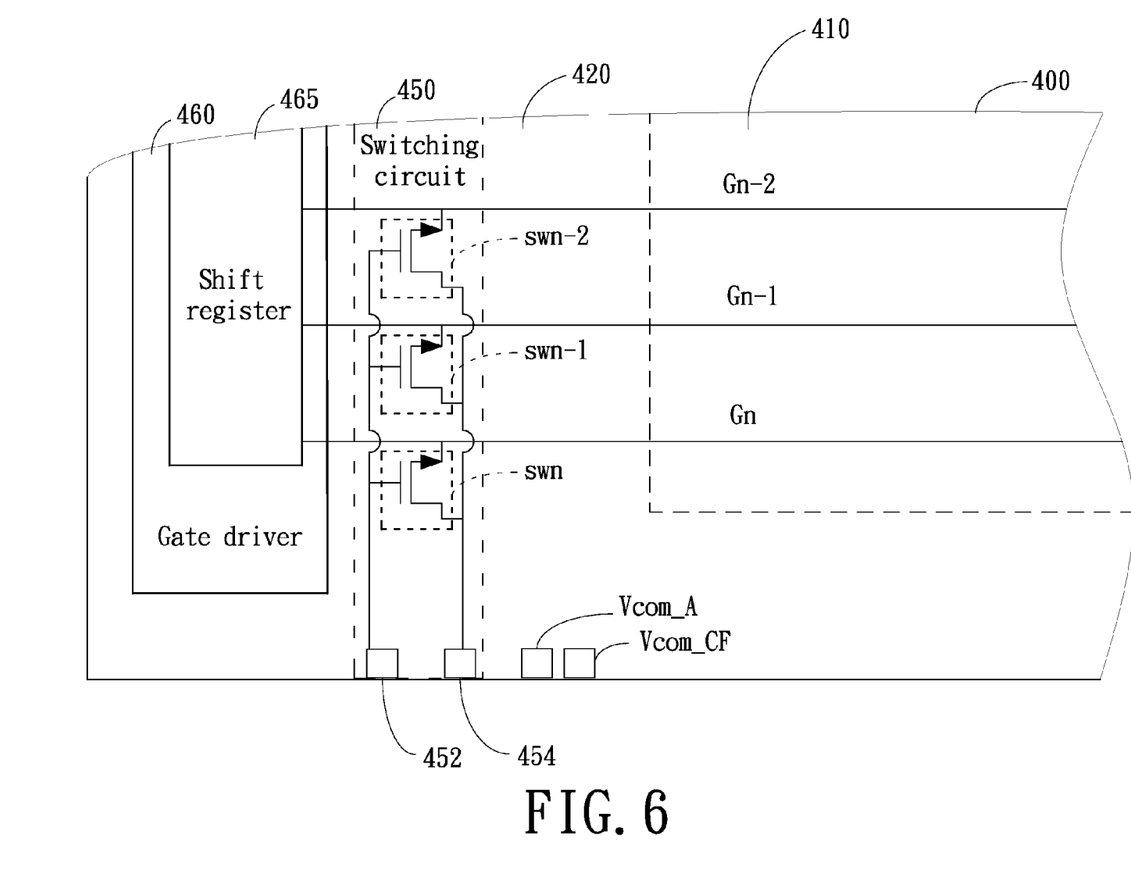
FIG. 6 is a schematic circuit diagram illustrating a first exemplary switching circuit used in the GOA substrate of the present invention.

FIG. 6 is a schematic circuit diagram illustrating a first exemplary switching circuit used in the GOA substrate of the present invention. As shown in FIG. 6, the output terminals of the shift register 465 of the gate driver 460 are connected with corresponding gate lines Gn-2, Gn-1 and Gn. In addition, the switching units swn-2, swn-1 and swn of the switching circuit 450 are connected with corresponding output terminals of the shift register 465.

An example of each of the switching units swn-2, swn-1 and swn is a thin film transistor. The drain of the thin film transistor is connected with a corresponding output terminal of the shift register 465. The gate of the thin film transistor is used as the control terminal of the switching unit, and connected with a first input pad 452. The source of the thin film transistor is connected with a second input pad 454. The first input pad 452 and the second input pad 454 are formed on an edge of the GOA substrate 400. The first input pad 452 and the second input pad 454 are connected with respective flexible cables (not shown). During the PSA process is performed, specified voltages may be provided to the first input pad 452 and the second input pad 454 through the flexible cables.

During the PSA process of the LCD panel is performed, a DC voltage (e.g. 20V) is provided to the first input pad 452 to be used as a control signal, and a specified voltage (e.g. a ground voltage) is provided to the second input pad 454. Consequently, during the PSA process is performed, all of the switching units are set to be in the short-circuit state according to the control signal. In the short-circuit state, a specified voltage may be transmitted to all of the gate lines G1~Gn. In such way, the possibility of generating the Mura defect in the active-matrix array of the visible zone 410 will be minimized or eliminated.

Of course, those skilled in the art will readily observe that the GOA substrate 400 may further comprise a slicing zone (not shown). During the PSA process of the LCD panel is performed, the specified voltage may be simultaneously provided to the second input pad 454, the TFT substrate common voltage input pad Vcom_A and the color-filtering substrate common voltage input pad Vcom_CF through the layout trace of the slicing zone. After the PSA process is completed, the slicing zone is cut off by a laser cutting technology. Meanwhile, the second input pad 454, the TFT substrate common voltage input pad Vcom_A and the color-filtering substrate common voltage input pad Vcom_CF are no longer connected with each other.

Alternatively, in some embodiments, the first input pad 452 and the second input pad 454 are formed on the slicing zone. After the PSA process is completed, the slicing zone is cut off by a laser cutting technology. Meanwhile, the conductive line segments between the first input pad 452, the second input pad 454 and all of the switching units are cut off, so that the first input pad 452, the second input pad 454 and all of the switching units are disconnected from each other.

Figure 7:
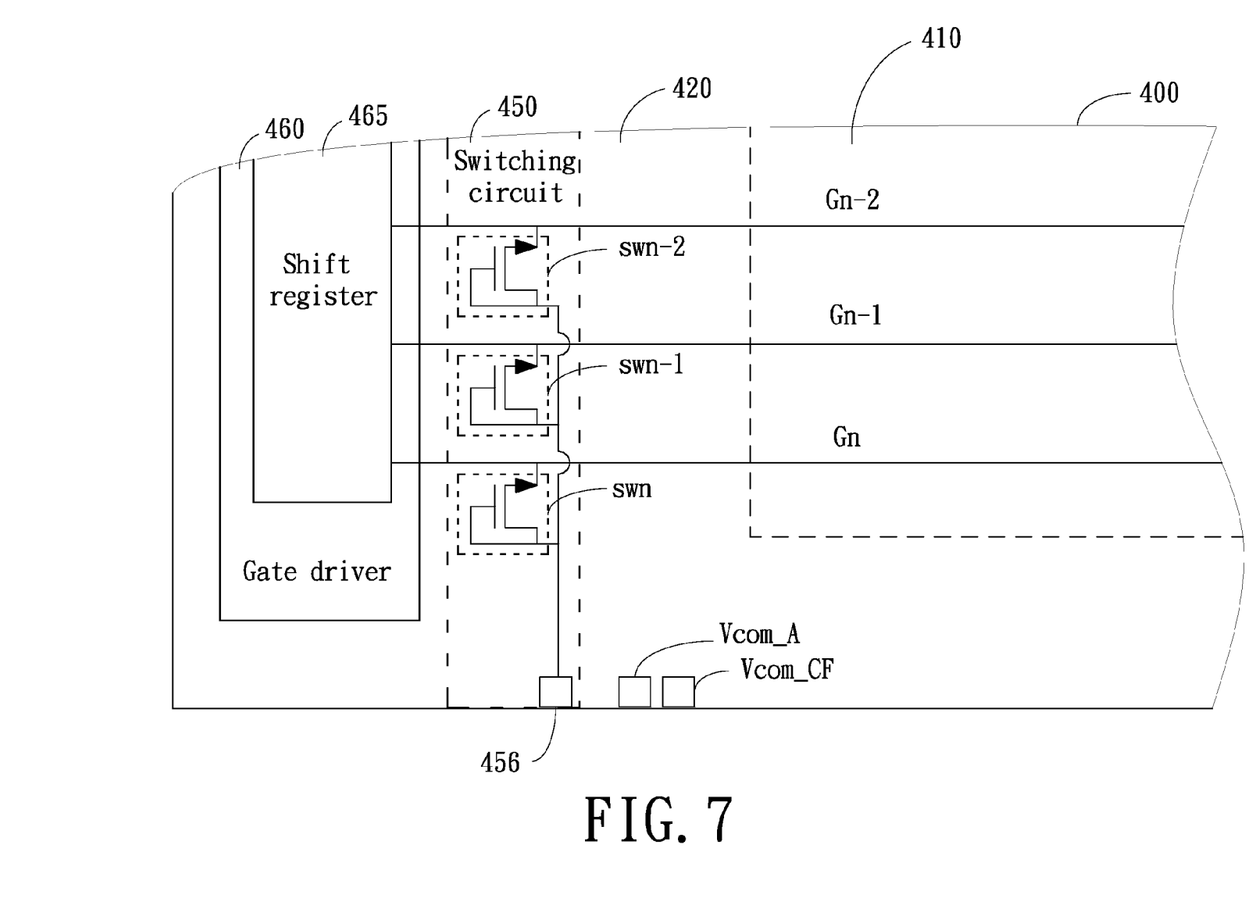
FIG. 7 is a schematic circuit diagram illustrating a second exemplary switching circuit used in the GOA substrate of the present invention.

FIG. 7 is a schematic circuit diagram illustrating a second exemplary switching circuit used in the GOA substrate of the present invention. As shown in FIG. 7, the output terminals of the shift register 465 of the gate driver 460 are connected with corresponding gate lines Gn-2, Gn-1 and Gn. In addition, the switching units swn-2, swn-1 and swn of the switching circuit 450 are connected with corresponding output terminals of the shift register 465.

An example of each of the switching units swn-2, swn-1 and swn is a thin film transistor. The drain of the thin film transistor is connected with a corresponding output terminal of the shift register 465. The gate and source of the thin film transistor are connected with each other, and further connected with a third input pad 456. The third input pad 456 is formed on an edge of the GOA substrate 400. The third input pad 456 may be connected with a flexible cable (not shown). During the PSA process is performed, a specified voltage may be provided to the third input pad 456 through the flexible cables.

During the PSA process of the LCD panel is performed, a DC voltage (e.g. 20V) is provided to the third input pad 456 to be used as a control signal and a specified voltage. Consequently, during the PSA process is performed, all of the switching units are set to be in the short-circuit state according to the control signal. In the short-circuit state, a specified voltage may be transmitted to all of the gate lines G1~Gn. In such way, the possibility of generating the Mura defect in the active-matrix array of the visible zone 410 will be minimized or eliminated.

Of course, those skilled in the art will readily observe that the GOA substrate 400 may further comprise a slicing zone (not shown). During the PSA process of the LCD panel is performed, the specified voltage may be simultaneously provided to the third input pad 456, the TFT substrate common voltage input pad Vcom_A and the color-filtering substrate common voltage input pad Vcom_CF through the layout trace of the slicing zone. After the PSA process is completed, the slicing zone is cut off by a laser cutting technology. Meanwhile, the third input pad 456, the TFT substrate common voltage input pad Vcom_A and the color-filtering substrate common voltage input pad Vcom_CF are no longer connected with each other.

Alternatively, in some embodiments, the third input pad 456 is formed on the slicing zone. After the PSA process is completed, the slicing zone is cut off by a laser cutting technology. Meanwhile, the conductive line segments between the third input pad 456 and all of the switching units are cut off, so that the third input pad 456 and all of the switching units are disconnected from each other.

From the above description, the present invention provides a LCD panel and a fabricating method thereof. The GOA substrate of the LCD panel further includes a switching circuit. During the PSA process of the LCD panel is performed, a specified voltage is transmitted to all gate lines of the GOA substrate through the switching circuit. Consequently, after the PSA process is completed, the Mura defects that are usually generated in the active-matrix array of the visible zone of the conventional GOA substrate will be eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A LCD panel, comprising:
   a gate driver disposed on a thin film transistor substrate, and comprising a shift register, wherein the shift register has plural output terminals for successively outputting plural gate driving signals;
   an active-matrix array disposed on the thin film transistor substrate, and comprising plural gate lines, wherein the gate lines are connected with the output terminals of the shift register;
   a switching circuit disposed on the thin film transistor substrate, and comprising plural switching units, wherein each of the switching units has a first terminal electrically connected with one of the output terminals of the shift register, a control terminal electrically connected with a first input pad, and a second terminal electrically connected with a second input pad;
   a color-filtering substrate; and
   a liquid crystal layer arranged between the color-filtering substrate and the thin film transistor substrate,
   wherein during a polymer stabilized alignment process is performed, a first voltage is provided to the first input pad, and a second voltage is provided to the second input pad,
   wherein the second input pad is further electrically connected with a common voltage input pad of the color-filtering substrate or the thin film transistor substrate.

2. The LCD panel according to claim 1, wherein the first input pad is electrically connected with the control terminal of the switching unit through a first conductive line segment, and the second input pad is electrically connected with the second terminal of the switching unit through a second conductive line segment.

3. The LCD panel according to claim 2, wherein after the polymer stabilized alignment process is completed, the first conductive line segment and the second conductive line segment are cut off, so that the first input pad and the second input pad are respectively disconnected from the control terminal and the second terminal of the switching unit.

4. The LCD panel according to claim 1, wherein the first input pad and the second input pad are formed on an edge of the LCD panel.

5. The LCD panel according to claim 1, wherein during the polymer stabilized alignment process is performed, heat energy or light energy is provided to the liquid crystal layer, so that liquid crystal molecules within the liquid crystal layer are aligned in a specified direction.

6. The LCD panel according to claim 1, wherein the first voltage is a positive voltage and the second voltage is a ground voltage.

7. The LCD panel according to claim 1, wherein the switching unit a thin film transistor, wherein the first terminal of the switching unit is a drain of the thin film transistor, the second terminal of the switching unit is a source of the thin film transistor, and the control of the switching unit is a gate of the thin film transistor.

8. A LCD panel, comprising:
   a gate driver disposed on a thin film transistor substrate, and comprising a shift register, wherein the shift register has plural output terminals for successively outputting plural gate driving signals;
   an active-matrix array disposed on the thin film transistor substrate, and comprising plural gate lines, wherein the gate lines are connected with the output terminals of the shift register; and
   a switching circuit disposed on the thin film transistor substrate, and comprising plural switching units, wherein each of the switching units has a first terminal electrically connected with one of the output terminals of the shift register, and a second terminal and a control terminal electrically connected with a first input pad.

9. The LCD panel according to claim 8, wherein the first input pad is electrically connected with the control terminal and the second terminal of the switching unit through a first conductive line segment.

10. The LCD panel according to claim 9, wherein the first input pad is formed on an edge of the LCD panel.

11. The LCD panel according to claim 10 further comprising:
    a color-filtering substrate; and
    a liquid crystal layer arranged between the color-filtering substrate and the thin film transistor substrate,
    wherein during a polymer stabilized alignment process is performed, a first voltage is provided to the first input pad.

12. The LCD panel according to claim 10, wherein the first input pad is further electrically connected with a common voltage input pad of the color-filtering substrate or the thin film transistor substrate.

13. The LCD panel according to claim 10, wherein the first voltage is a positive voltage.

14. The LCD panel according to claim 10, wherein during the polymer stabilized alignment process is performed, heat energy or light energy is provided to the liquid crystal layer, so that liquid crystal molecules within the liquid crystal layer are aligned in a specified direction.

15. The LCD panel according to claim 10, wherein after the polymer stabilized alignment process is completed, the first conductive line segment is cut off, so that the first input pad is disconnected from the control terminal and the second terminal of the switching unit.

16. The LCD panel according to claim 8, wherein the switching unit a thin film transistor, wherein the first terminal of the switching unit is a drain of the thin film transistor, the second terminal of the switching unit is a source of the thin film transistor, and the control of the switching unit is a gate of the thin film transistor.

* * * * *